June 20, 1933.  W. E. HUMPHREY  1,914,689
EXTRUSION PRESS
Filed Jan. 28, 1933  2 Sheets-Sheet 1
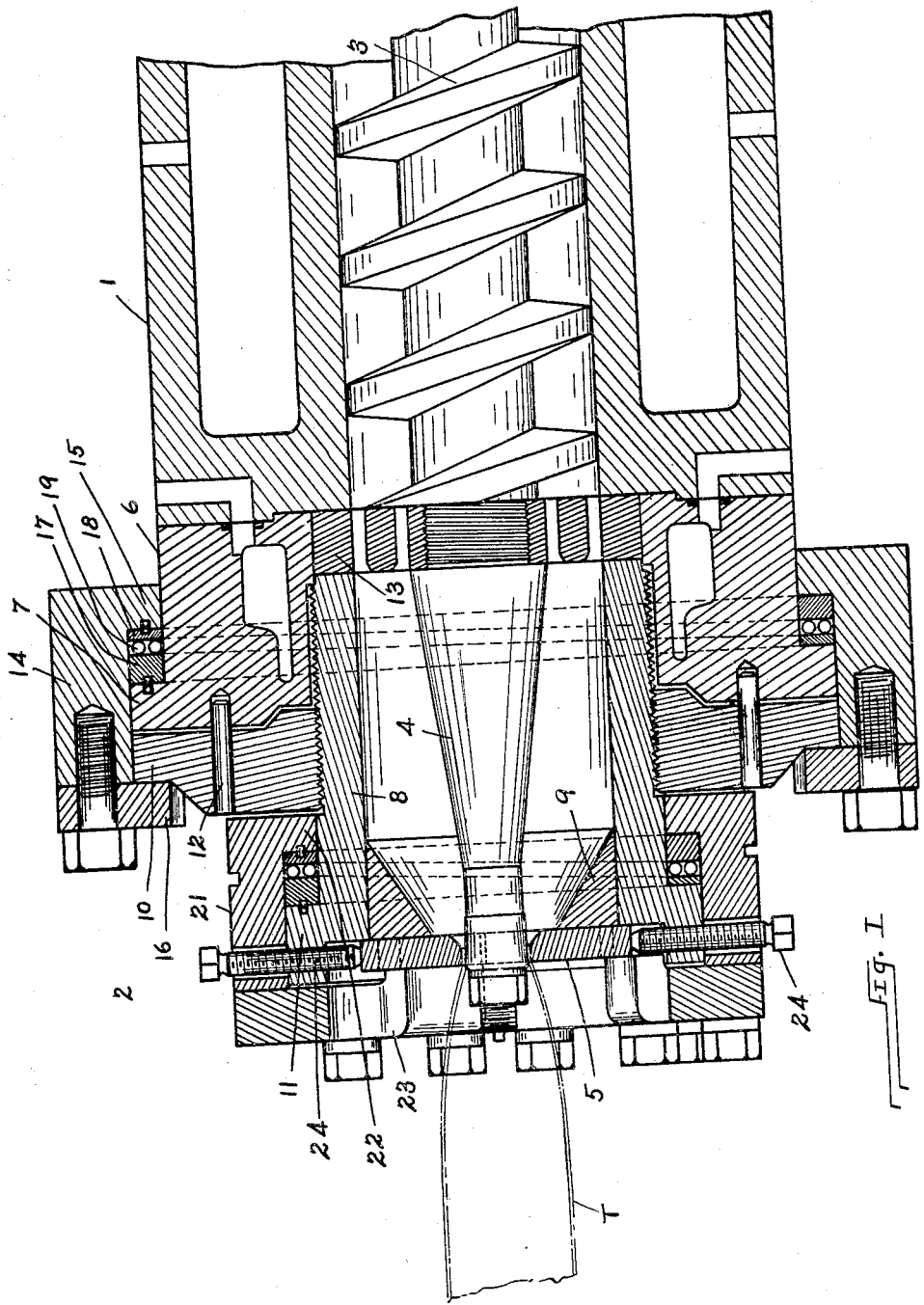
Fig. I
INVENTOR
Walter E. Humphrey
by Christy Christy and Wharton
his attorneys June 20, 1933.  W. E. HUMPHREY  1,914,689
EXTRUSION PRESS
Filed Jan. 28, 1933   2 Sheets-Sheet 2
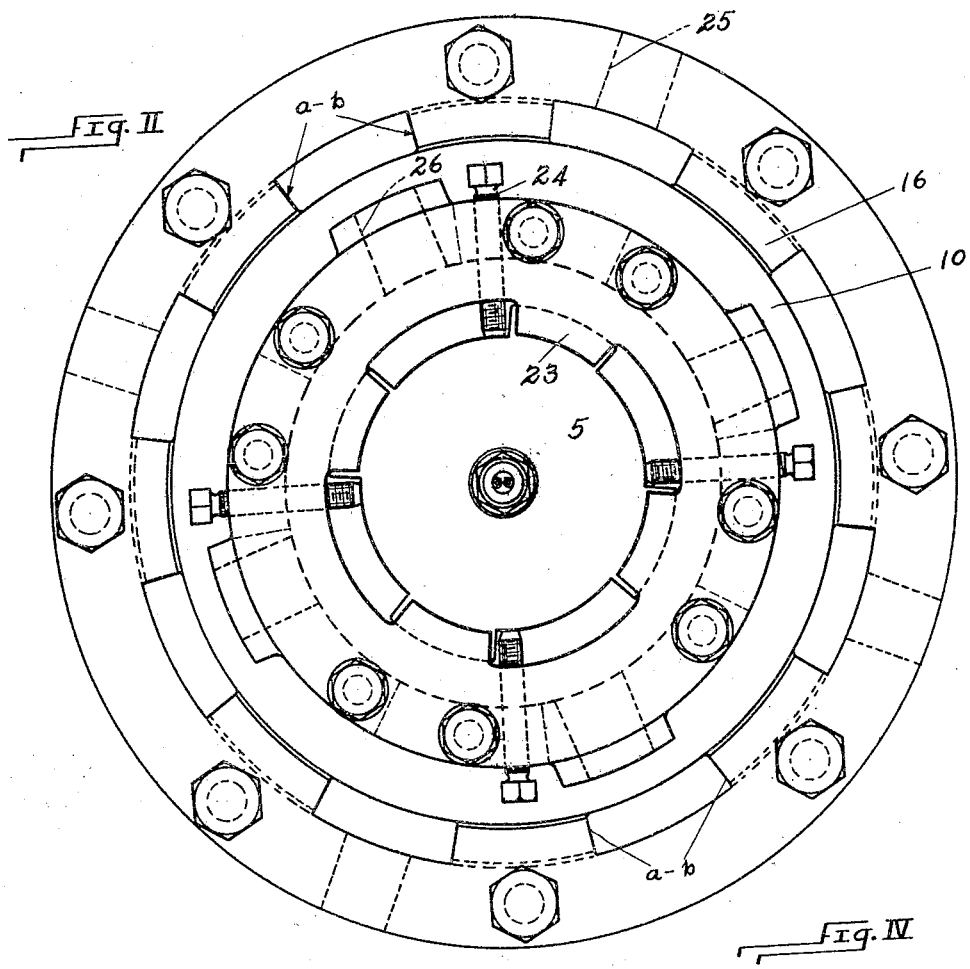
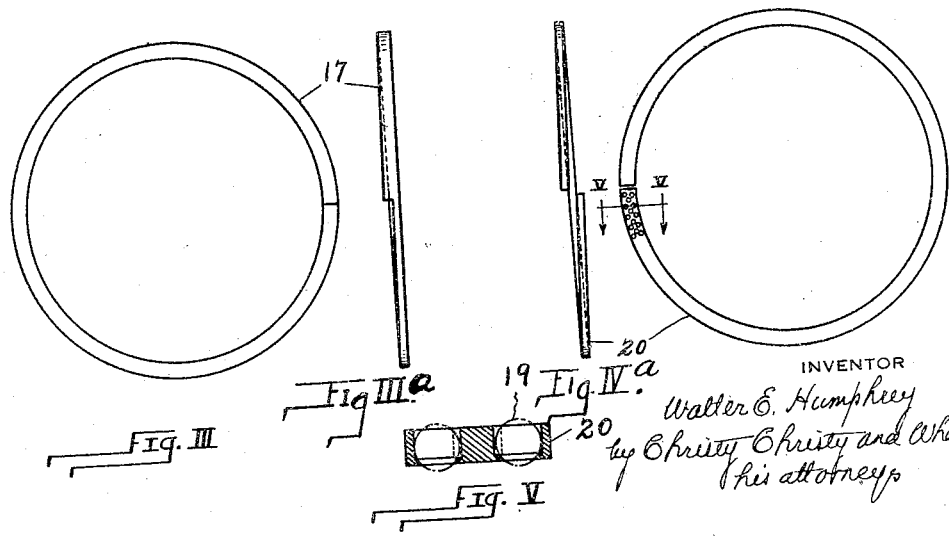
INVENTOR
Walter E. Humphrey
by Christy Christy and Wharton
his attorneys Patented June 20, 1933

1,914,689

UNITED STATES PATENT OFFICE

WALTER E. HUMPHREY, OF JEANNETTE, PENNSYLVANIA, ASSIGNOR TO PENNSYLVANIA RUBBER COMPANY, A CORPORATION OF PENNSYLVANIA

EXTRUSION PRESS

Application filed January 28, 1933. Serial No. 653,971.

This invention relates to extrusion presses, and consists in such connection between the die-carrying head and the body of the press, and between the parts of the die-carrying head, as permits of facility in the replacement of one die or of one die part by another, and effects a consequent substantial economy in the normal use of such machinery. The invention has been developed in application to a press for extruding the continuous tube of unvulcanized rubber that constitutes the stock from which the inner tubes of pneumatic vehicle tires are fabricated; and in that particular application it will here be shown and described.

Fig. I is a view in vertical and axial section of the delivery end of an extrusion press for forming inner tube stock, in which the structural features that constitute the present invention are found; Fig. II is a view of the same press in front elevation (as viewed from the left, Fig. I); Fig. III is a view in front elevation of one of a pair of cooperating wedge rings; Fig. IIIa is a view in side elevation of the wedge ring shown in Fig. III; Fig. IV is a view in front elevation of a cage for bearing balls; Fig. IVa is a view in side elevation of the cage for bearing balls shown in Fig. IV; and Fig. V is a view to larger scale showing the ball cage in cross-section, on the plane indicated at V—V, Fig. IV.

The press comprises a body 1 and a removable and replaceable head 2. The body is cylindrical, and within the cylinder chamber are arranged extruding means, ordinarily in the form of a screw 3, by the rotation of which the body of raw rubber that is contained within the cylinder is extruded through the head. The cylinder and its screw, and the means for rotating the screw, together with the provision for feeding raw rubber to the remote (right-hand) end of the cylinder, are known features, and do not require further description.

The head carries a two-part die, through whose orifice the rubber, shaped to tubular form, is extruded. These two parts are a mandrel 4 and an orificed plate 5. The mandrel is removable on the removal of the head from the cylinder; the orificed plate, carried by the head, is removable with the head, and it is additionally separable from the head—to the end that with one and the same mandrel, continuing in assembly with the cylinder, one and another orificed plates may be assembled; or, alternatively, the die assembly may in its entirety be removed and replaced.

To the forward or delivery end of cylinder 1 (the left-hand end as seen in Fig. I) an extension 6 is rigidly secured. This extension is annular in shape; its interior diameter exceeds that of the cylinder—and, accordingly, it forms with the end wall of the cylinder a seat for the mandrel-carrying spider, presently to be described. The annular extension 6 is further provided at its forward end with an outstanding peripheral flange 7.

The head consists of a cylindrical member 8, having an interior diameter equal with that of cylinder 1, so that in the assembly it constitutes an extension of the cylinder chamber. In the forward end of the bore of the cylindrical member 8 is set a ring 9 of triangular cross-section, which has the effect of reducing the interior diameter of the head and giving to the chamber within the head a forwardly tapering shape, and reducing the size of the bore through which the body of plastic rubber is pressed to approximation to the size of the orifice in plate 5. Exteriorly, the cylindrical member 8 is screw-threaded and carries adjustably an annulus 10. At its forward end the member 8 is provided with an outstanding peripheral flange 11.

Provision is made that the annulus 10 shall in the assembly be so united with the extension 6 of the cylinder 1 as to resist tendencies to rotation relatively thereto. To such end, the annulus is provided with pins 12 that enter orifices in extension 6 formed to receive them.

Between the cylindrical member 8 of the head and the cylindrical body of cylinder 1 a spider 13 is clamped. The spider carries centrally the mandrel 4 rigidly mounted upon it, and toward its periphery it is ported, to allow the plastic rubber impelled by screw 3 to pass from the cylinder 1 into the head.

Assembly of the head with the body of the press is effected by first seating spider 13, then bringing annulus 10 to place (the cylindrical member 8 being mounted within it) to abutment upon flange 7, and finally turning body 8 within the seated annulus until it comes to abutment upon the seated spider. It remains then to clamp the parts securely in such assembled positions.

The annulus 10 is of overall diameter equal with flange 7, and in assembly annulus and flange come to face-to-face abutment. The periphery of the annulus is toothed or castellated. That is to say, at the periphery the annulus is cut away, to form spaces a—b in its continuity. A locking-ring 14 with a flange 15 that lies to rearward of flange 7 and with a discontinuous and intermittent flange 16 that in the assembly extends forwardly of annulus 10 is rotatable upon extension 6. In one position in the range of rotation of the locking-ring 14 the breaks or interruptions in flange 16 coincide with the teeth or castellations upon annulus 10, and then the head is freely removable from and replaceable upon the cylinder 1; in another position the substance of the flange 16 overlies the teeth or castellations of the annulus 10, and then the head is locked to the cylinder.

Upon the rearward face of flange 7 is set a wedge-ring 17 of tool steel (cf. Fig. III), and upon the forward face of flange 15 is set a corresponding wedge-ring 18 of tool steel. These two rings are pinned to the flanges which they face and so have no motion of rotation independently of the flanged bodies that carry them. The details of Figs. III and IV suffice to illustrate the structure of the two rings 17 and 18. The inclination of the wedge surfaces of the two rings is such that as the locking-ring 14 is rotated in one direction and the other wedge action is made effective to draw the head to the body of the press, and, alternatively, to relieve such compression. Between the two wedge-rings 17 and 18 is advantageously included a set of bearing balls 19. These are conveniently carried in double row in a cage 20, such as is illustrated in Figs. IV, IVa, and V.

The joint between head and cylinder of the press thus described is, it will be perceived, a bayonet-joint; and the bayonet-joint is of common application. It has not heretofore been found applicable to this assembly of parts; because, in operation of this apparatus, great stress is imposed upon the joint, and it is requisite that in the joint two features co-exist: nicety in position, and uniformity in distribution of stress. Heretofore such co-existence of requisite features has been found only in a screw-thread joint; and the screw-threads have necessarily been relatively fine and of low pitch and of relatively great extent. It has followed that with such a heavy replaceable part as the head of one of these presses, replacement has been a very nice operation, that has had to be most carefully performed, with much skill upon the part of those who perform it, with large consumption of time, and with an inevitably large factor of deterioration, because of injury to the screw-threads. By the refinements described, and particularly by the provision of wedge-rings of tool steel and ball bearings, the bayonet-joint is made available to this use; precision in placement is achieved, and adequate distribution of stresses; and in consequence notable saving is effected, both in the time consumed in making replacement and in ruggedness and durability of the joint-forming members.

The orificed plate 5 is removably secured in its place in the head 8 by a bayonet-joint, similarly refined. The periphery of the plate 5 is castellated. A locking-ring 21 is rotatable upon the flange 11 upon the cylindrical member 8. Rearwardly a flange 22 upon ring 21 overlies the flange 11, and forwardly an incomplete and interrupted flange 23 overlies the castellated rim of plate 5. The opposed faces of flanges 11 and 22 are provided with wedge-rings of tool-steel, with bearing balls between. As in the case already described, rotation of ring 21 is effective alternately to clamp plate 5 securely to or to leave it free to be removed from the head of the press.

The orificed plate 5, it will be remarked, thus assembled and secured, may be effective to hold the ring 9 in its place at the forward end of the cylindrical chamber within the head.

In the assembly, the orified plate 5 is minutely adjustable in its position relatively to the mandrel 4, and to that end it is carried by and between radially extending and adjustable bolts 24 borne by the cylindrical member 8. In order to permit of co-operation with such an assembly, the ring 21 is provided with recesses through which the bolts 24 are accessible and through which these bolts preferably extend. The recesses afford necessary clearance, to permit the rotation of the ring through a sufficient range without interference by the bolts.

Orifices 25 and 26 in the locking-rings 14 and 21 afford purchase for a tool by means of which rotation may more easily be effected.

Certain well-known features need not be dwelt upon—the provision for the water-cooling of the cylinder and its extension; the provision for blowing through a nozzle in the forward end of the mandrel of material to prevent cohesion between contacting areas of the inner surface of the tube of uncured rubber when after passing from the extruding die it collapses.

In operation, the parts being assembled as shown in Fig. I and the spaces within cylinder and head being full of plastic, uncured (and, ordinarily, heated) rubber (compounded in usual manner), rotation of screw 3 effects extrusion of a tube which, flattening as it advances, is indicated in broken lines at T.

With one and the same mandrel 4 one or another orifice plate 5 may be combined, to afford tubes different in diameter and in wall thickness. It happens too that an orificed plate 5 may by wear, or for other reason require replacement, while the mandrel continues in good and serviceable condition. In either case the rotation of ring 21 and the easing of bolts 24 will allow for prompt and easy replacement. The new plate is properly set by means of bolts 24 and then the ring 21 is turned to tighten the plate in its desired position. The wedge-rings with their bearing balls afford a tightening means which is at once easily operated and secure; it affords the desired minute accuracy of position, and the essential even distribution of stress.

If the mandrel is to be replaced, or if the whole die assembly is to be removed and another inserted in its place, the ring 14 is rotated, and at once the entire head is free and may be lifted away.

I claim as my invention:

1. In an extrusion press a cylinder flanged at the end and equipped with extruding means, a die-carrying head having a circular peripheral extension adapted in the assembly to extend adjacent the flange of the cylinder, a locking-ring encircling the assembled flange and extension and provided with flanges that overlie the assembled flange and extension both rearwardly and forwardly, and a pair of co-operating wedge-rings rigidly borne, one ring by the flange-and-extension assembly, the other by the locking-ring, with bearing balls between, the said locking-ring and one member of the flange-and-extension assembly being provided with complementary castellations, whereby rotation of the ring upon the flange-and-extension assembly is effective, alternately to clamp the parts together and to release them, permitting separation.

2. In an extrusion press a cylinder flanged at the end and equipped with extruding means, a die-carrying head having a circular extension with peripheral castellations adapted in the assembly to extend adjacent the flange of the cylinder, a locking-ring rotatably borne by the flange upon the cylinder and itself equipped with flanges which in the assembly extend to rearward of the flange upon the cylinder and forwardly of the extension upon the head, the last-named flange being interrupted in its continuity, and a pair of co-operating wedge-rings rigidly borne, one by the flange upon the cylinder, the other by the locking-ring, with bearing balls between, whereby on rotation of the locking-ring an assembled head is alternately clamped to the cylinder and released, to permit separation.

3. In an extrusion press a cylinder equipped with extruding means, a spider bearing a mandrel adapted to be clamped upon the end of the cylinder, and a head equipped with an orificed plate adapted to engage the spider when in place, and means for securing the parts of such assembly, such means including flanges borne by cylinder and head and a locking-ring rotatable upon the cylinder-borne flange and itself provided with flanges that overlie rearwardly and forwardly the flanges of the assembled parts, one of the flanges of the ring and the flange borne by the head being provided with complementary castellations and the other flange of the ring and the flange of the cylinder being equipped one with each of two co-operating wedge-rings, and bearing balls situated between the assembled wedge-rings, whereby rotation of the locking-ring when the parts are assembled is effective alternately to secure the parts together and to release them, permitting separation.

4. In an extrusion press a cylinder flanged at the end and equipped with extruding means, a spider bearing a mandrel adapted to be clamped upon the end of the cylinder, a head including a flanged cylinder and provided with a circular extension with castellated perimeter adapted to engage the spider and hold it in place, a locking-ring rotatable upon the flange on the cylinder and itself equipped with flanges that overlie rearwardly the flange on the cylinder and forwardly the extension on the head, the forward flange being interrupted in continuity, a pair of co-operating wedge-rings rigidly borne, one by the flange on the cylinder and the other by the locking-ring with bearing balls between, an orificed plate with castellated margins, a second locking-ring rotatably borne by the flange upon the head and itself provided with flanges that overlie rearwardly the flange on the head and forwardly the orificed plate, the forward flange being interrupted in continuity, and a pair of co-operating wedge-rings rigidly borne, one by the flange on the head and the other by the second locking-ring, with bearing balls between.

5. In an extrusion press the combination of a cylinder and a head, with means whereby the head may be removably secured to the cylinder, such means including a pair of outstanding circular flanges borne severally by the cylinder and the head, one of which is castellated, the other entire, a locking-ring rotatably borne by that one of the said pair of flanges that is entire and not castellated, such locking-ring being provided with a flange of interrupted continuity and adapted thereby for interlock with the castellated flange aforesaid, and a pair of co-operating wedge-rings borne severally by the locking-ring and the flange upon which the locking-ring is borne.

In testimony whereof I have hereunto set my hand.

WALTER E. HUMPHREY.